(12) United States Patent
Hergault

(10) Patent No.: US 9,059,783 B2
(45) Date of Patent: Jun. 16, 2015

(54) ELECTRONIC DEVICE WITH A CARRIER CURRENT

(75) Inventor: Stéphane Hergault, Rueil-Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 864 days.

(21) Appl. No.: 13/141,194

(22) PCT Filed: Dec. 11, 2009

(86) PCT No.: PCT/FR2009/001416
§ 371 (c)(1),
(2), (4) Date: Jun. 21, 2011

(87) PCT Pub. No.: WO2010/072909
PCT Pub. Date: Jul. 1, 2010

(65) Prior Publication Data
US 2011/0248774 A1    Oct. 13, 2011

(30) Foreign Application Priority Data
Dec. 22, 2008    (FR) ..................... 08 07337

(51) Int. Cl.
*H02J 1/00*        (2006.01)
*H04B 3/56*        (2006.01)
*H04B 3/54*        (2006.01)

(52) U.S. Cl.
CPC .. *H04B 3/56* (2013.01); *H04B 3/54* (2013.01); *H04B 3/542* (2013.01); *H04B 2203/5491* (2013.01)

(58) Field of Classification Search
USPC .............................................................. 307/1
See application file for complete search history.

(56) References Cited

U.S. PATENT DOCUMENTS

2002/0080010 A1\* 6/2002 Zhang ...................... 340/310.06
2006/0044076 A1\* 3/2006 Law .............................. 333/124
2006/0227884 A1\* 10/2006 Koga et al. .................... 375/257

FOREIGN PATENT DOCUMENTS

EP    1 343 253 A    9/2003
EP    1 603 250 A1   12/2005

\* cited by examiner

*Primary Examiner* — Jared Fureman
*Assistant Examiner* — Duc M Pham
(74) *Attorney, Agent, or Firm* — Muncy, Geissler, Olds & Lowe, P.C.

(57) ABSTRACT

A device comprising both a box containing an electronic central unit, and power supply module connected to the central unit. The device also includes an external power supply block connected to the module by an electric cable and provided with both a connection member for connection to a power supply network delivering AC power and a data signal superposed thereon. A converter is provided for converting the AC power. The box includes a carrier current data transmission module, the converter being connected to the connection member and to the electric cable via a first diverter member that extracts and diverts the data signal relative to the converter. The module is connected to the electric cable by a second diverter member for separating the converted power supply current and the data signal and for bringing the power supply current to the power supply module and the data signal to the transmission module.

6 Claims, 2 Drawing Sheets

ELECTRONIC DEVICE WITH A CARRIER CURRENT

FIELD OF THE INVENTION

The present invention relates to an electronic device for connection to a power supply network delivering both alternating current (AC) power and a data signal superposed on the AC power. This type of digital data transfer making use of electricity lines is known by the abbreviation PLC (power line carrier). By way of example, such a device is a television (TV) signal decoder, a gateway giving access to an Internet type network, or any other device suitable for accessing a network.

BACKGROUND OF THE INVENTION

Such a device comprises a box containing an electronic central unit and an internal power supply module connected to the central unit. The central unit is arranged to process signals, data, and other information, to perform calculations, to control the display of images or the delivery of sounds, .... The internal power supply module generally comprises a direct-current/direct-current (DC/DC) converter that delivers current presenting characteristics appropriate for powering the central unit and the other components of the device. The internal power supply module is connected by an electric cable to an external power supply block provided with a member for connection to the power supply network that delivers AC power having data signals superposed thereon, and with a converter for converting the AC power into DC power. It is known to have one external data transmission module per carrier current. The external data transmission module is an interface that separates or combines data signals and a carrier current in order to enable the central unit to exchange data with the network. The external transmission module is provided with means for connecting it to the power supply network and it is connected to the central unit by an Ethernet type connection cable. This requires two electricity outlets to be available in the vicinity of the location of the device: one for connecting the power supply block and the other for connecting the external transmission module.

In order to obviate that drawback, it is known to incorporate the transmission module in the external power supply block such that the power supply block is connected to the central unit via a combination cable comprising both a two-wire power cable and an Ethernet connection cable. The AC power for the device is then the carrier current. The combination cable fitted with its special connectors is relatively expensive. In addition, the power supply block is found to be relatively bulky.

OBJECT AND SUMMARY OF THE INVENTION

An object of the invention is to obviate the above-mentioned drawbacks.

The invention provides a device comprising both a box containing an electronic central unit, and an external power supply block connected to the central unit by an electric cable and provided both with a connection member for connection to a power supply network delivering AC power and a data signal superposed thereon, and with a converter for converting the AC power. The box comprises a carrier current data transmission module, the converter is connected to the connection member and to the electric cable via a first diverter member that extracts and diverts the data signal relative to the converter, and the module and the central unit are connected to the electric cable by a second diverter member for separating the converted power supply current and the data signal and bringing the power supply current to the central unit and the data signal to the transmission module.

Thus, the first diverter member separates the data signal from the power supply current to deliver the power supply current to the converter and to superpose the data signal on the converted power supply current at the outlet from the converter. The converted power supply current on which the data signal is superposed is conveyed via an electric cable which may be a conventional two-wire cable to the second diverter member. The second diverter member separates the data signal, which it forwards to the transmission module, from the power supply current, which it forwards to the central unit, possibly via an interposed power supply module. This structure thus enables the transmission module to be incorporated in the box of the device, which box is connected to the power supply network solely via a single connection member.

In a particular embodiment, the first diverter member has a shunt connection line connecting the connection member to the electric cable and incorporating a carrier frequency filter, the converter being connected to the shunt connection line on either side of the carrier frequency filter by an inlet line and an outlet line of the converter, the diverter member having power frequency filters connected respectively in the inlet and outlet lines.

By way of example, the carrier frequency filter is a bandpass filter or a highpass filter arranged to pass the data signals that are at a relatively high frequency, and the power frequency filter is, for example, a lowpass filter arranged to pass the power supply current at a frequency that is relatively low (in the range 50 hertz (Hz) to 60 Hz for AC power).

Advantageously, at least one inductor is connected in the shunt connection line between the carrier frequency filter and the outlet line.

This inductor provides better transmission of carriers, more particularly when the carrier frequency filter is a capacitor.

Advantageously, the second diverter member comprises a first line connected to the electric cable and having connected thereto a second line connected to the central unit and a third line connected to the transmission module, the second line being fitted with a power frequency filter and the third line being fitted with a carrier frequency filter.

This embodiment is particularly simple.

BRIEF DESCRIPTION OF THE DRAWINGS

Other characteristics and advantages of the invention appear on reading the following description, in particular of particular non-limiting embodiments of the invention.

Reference is made to the accompanying drawings, in which.

MORE DETAILED DESCRIPTION OF THE PREFERRED EMBODIMENTS

Figure 1:
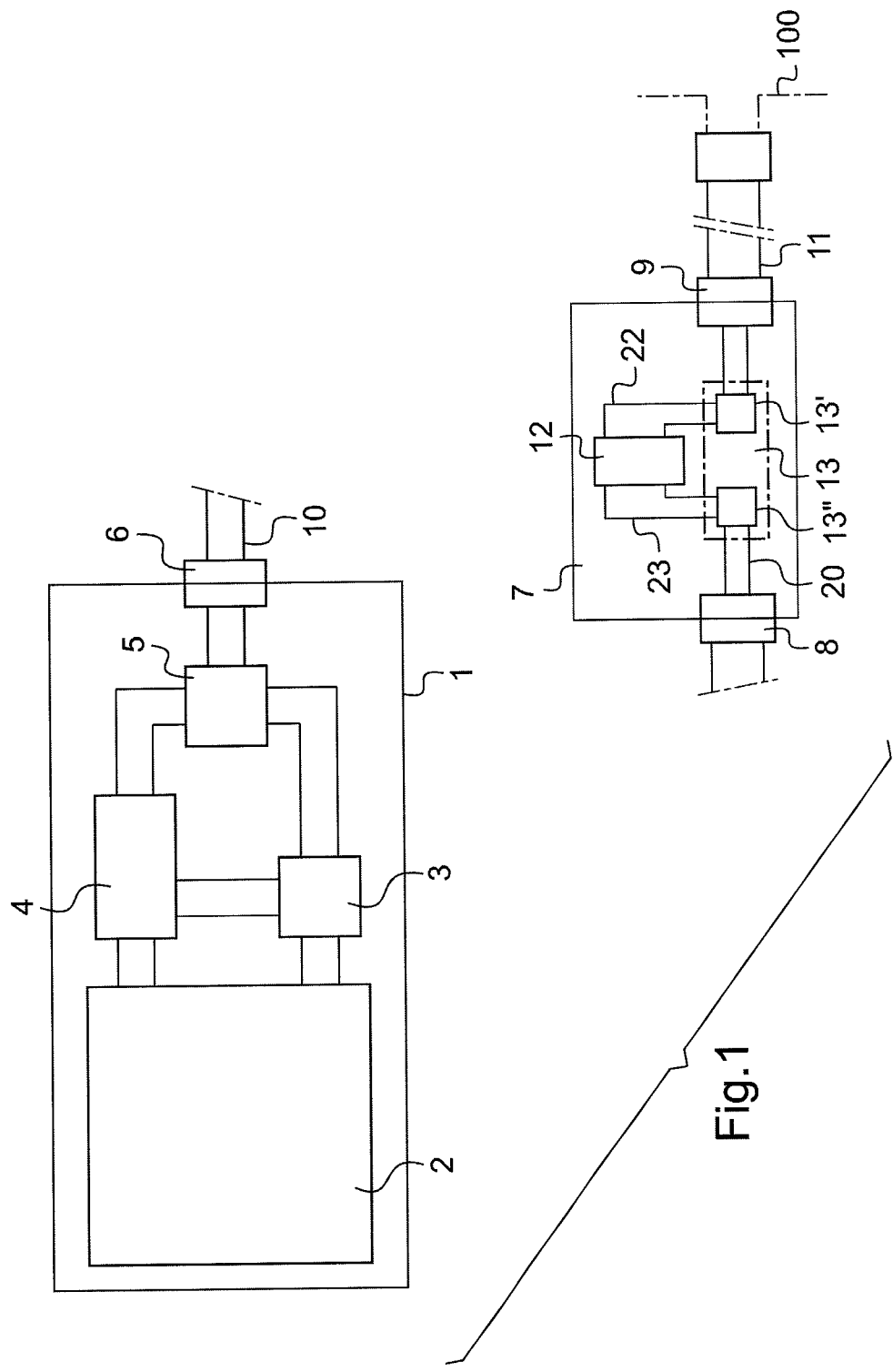
FIG. 1 is a diagrammatic view of the device in accordance with the invention.

By way of example, the device in accordance with the invention is a decoder of television signals, a gateway giving access to the Internet, a router, . . . for connection to at least one electricity power supply network over which data signals pass superposed on so-called "carrier" currents. That type of network and the technique for transmitting data signals, usually by frequency multiplexing, are themselves known and are not described in detail herein.

With reference to the figures, the device comprises a box 1 containing an electronic central unit 2, a carrier current transmission module 3, and if necessary a power supply module 4, both of which are connected to the central unit 2. In conventional manner, the central unit 2 comprises in particular a processor and one or more memories containing an operating program executed by the processor to enable the device to operate. The power supply module 4 comprises a DC/DC converter arranged to provide the central unit 2, the transmission module 3, and the other components of the device with the voltages they need to operate.

The transmission module 3 and the power supply module 4 are connected to a diverter member 5 that is itself connected to a connector 6 for coupling to an external power supply block 7 that is provided with a connector 8 and with a connector 9. An electric cable 10 is connected to the connectors 6 and 8. The cable 10 is a conventional two-wire cable, e.g. of the coaxial type, and the connectors 6 and 8 are two-pole connectors. The connector 9 is connected to a cable 11 for connection to the power supply network 100 that supplies the AC power supply needed for powering the device together with data signals superposed thereon.

The external power supply block 7 includes an AC/DC converter 12 for converting the AC power supply into DC power supply and for reducing its voltage.

The converter 12 is connected to the connectors 8 and 9 via a diverter member 13.

The diverter members 5 and 13 are three-port filters that enable two frequency bands to be separated (the diverter members are more specifically referred to as "diplexers" in the jargon of the technical field in question since they provide multiplexing on two frequencies: the AC power supply frequency and the carrier frequency of the data signals). The diverter members are thus arranged to separate the power supply AC from the data signal.

Figure 2:
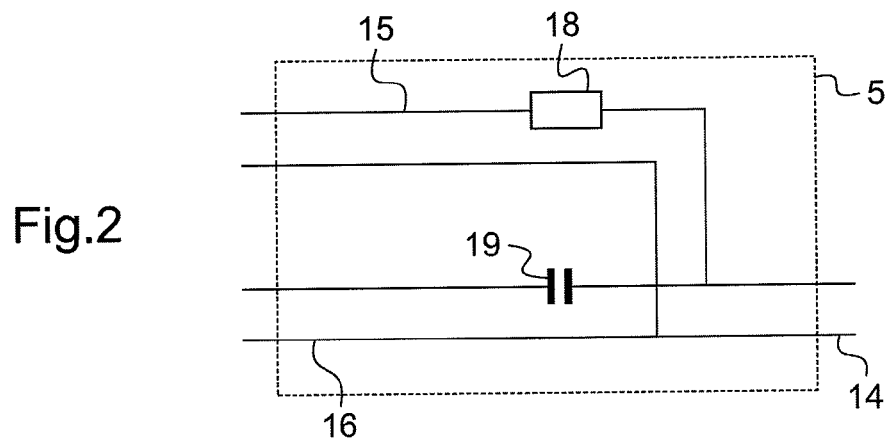
FIG. 2 is a detailed schematic of the diverter element 5 of FIG. 1.

With reference to FIG. 2, the diverter member 5 comprises a first line 14 connected to the connector 6 and thus to the cable 11, and having connected thereto a second line 15 connected to the power supply module 4, and a third line 16 connected to the transmission module 3. The second line 15 is fitted with a power frequency filter 18, and the third line 16 is fitted with a carrier frequency filter 19. The power frequency filter 18 is an inductor connected in one of the two conductors forming the second line 15, and the carrier frequency filter 19 is a capacitor connected in one of the two conductors forming the third line 16. The diverter member 5 is thus arranged to bring power supply current to the power supply module 4 and the data signal to the transmission module 3.

The diverter member 13 likewise comprises an AC diplexer 13' at the inlet to the converter 12 and a DC diplexer 13" at the outlet from the converter 12.

Figure 3:
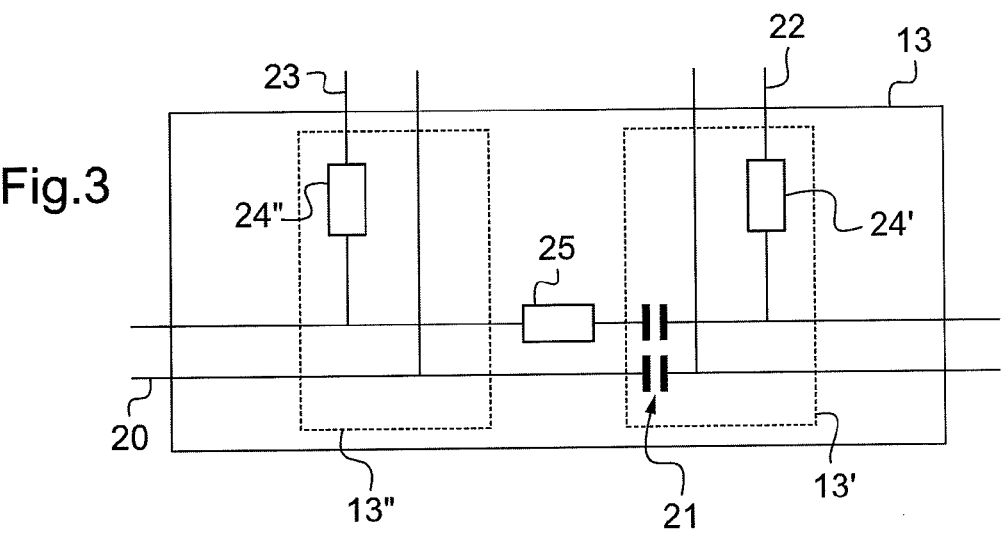
FIG. 3 is a detailed schematic of the power supply block in a first embodiment of the invention, constituting the element 13 of FIG. 1.

With reference to FIG. 3, the diverter member 13 in the first embodiment includes a shunt line 20 connecting the connector 8 to the connector 9 and including a carrier frequency filter given overall reference 21. The converter 12 is connected to the shunt line 20 on either side of the carrier frequency filter 21 by an inlet line 22 and by an outlet line 23 of the converter 12. The diverter member 13 has a power frequency filter 24' mounted on one of the two connectors forming the inlet line 22, and a power frequency filter 24" mounted on one of the two connectors forming the outlet line 23. The power frequency filter 24', 24" is an inductor, and the carrier frequency filter 21 is a capacitor connected in each of the two conductors forming the shunt line 20. An inductor 25 is mounted in one of the conductors of the shunt line 20 between the carrier frequency filter 21 and the outlet line 23. The diverter member 13 is thus arranged to extract and divert the data signal relative to the converter 12: the data signal transits over the shunt line 20 without passing through the converter 12 and it is superposed on the rectified power supply current (i.e. DC) outlet from the converter 12 in the direction for enabling the device to receive data signals.

When the device transmits data signals, the data signals transit from the transmission module 3 to the power supply network by passing via the diverter member 5, the connector 6, the cable 10, the connector 8, the shunt line 20, the diverter member 13, and the connector 9.

An example of dimensioning is given below with reference to the following characteristics:
- carrier frequency lying in the range 1 megahertz (MHz) to 2 MHz (here 1.5 MHz);
- power supply network having a voltage of 240 volts (V) and a frequency of 50 Hz;
- device powered at 12 V and drawing a current of 2 amps (A); and
- device belonging to class II of the EN 60950 standard.

Under such conditions, the inductors of the power frequency filters 24 have a minimum inductance of 160 microhenries ($\mu$H) and the capacitors forming the carrier frequency filters 21 have a maximum capacitance of 2 nanofarads (nF). The inductor 25 has an inductance of about 11 $\mu$H so as to resonate with the capacitors forming the carrier frequency filters 21.

Figure 4:
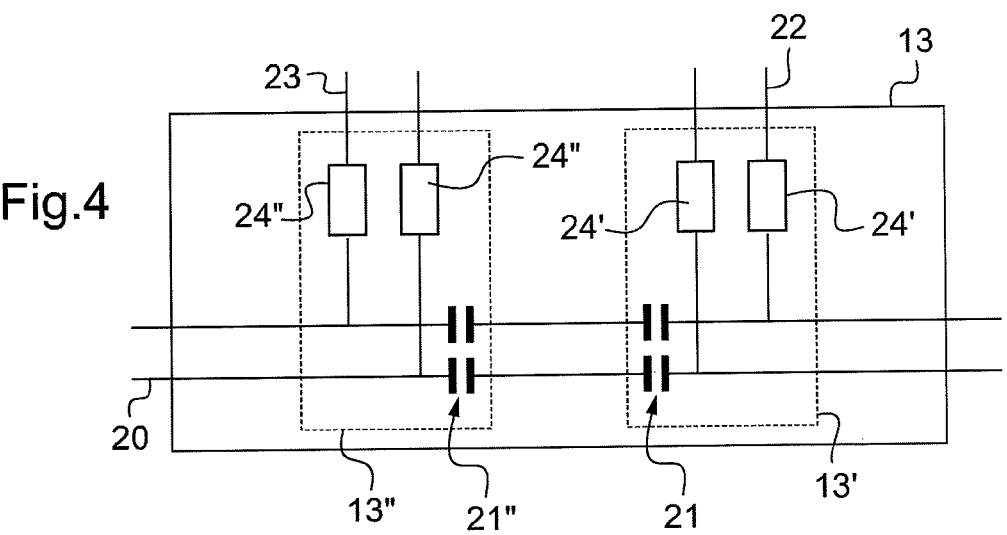
FIG. 4 is a view analogous to FIG. 3 showing a power supply block in a second embodiment of the invention, constituting the element 13 of FIG. 1.

With reference to FIG. 4 and in the second embodiment of the diverter member 13, the shunt line 20 connecting the connector 8 to the connector 9 includes two carrier frequency filters 21', 21" connected in series in each of the two conductors forming the shunt line 20. Power frequency filters 24', 24" are mounted in each of the two conductors forming the inlet line 22 and the outlet line 23, respectively. Each power frequency filter 24', 24" is an inductor and each carrier frequency filter 21', 21" is a capacitor.

Naturally, the invention is not limited to the embodiments described, but covers any variant coming within the field of the invention as defined by the claims.

In particular, the circuit may differ from those described. Any electronic component suitable for performing any of the described functions may take the place of the component mentioned in the description with respect to that function. The filters may be components that are different from one another.

In the first embodiment, each conductor may be fitted with an inductor 24 or 25. The capacitors may be replaced by other passive filters or by active filters.

In the second embodiment, one inductor in each line suffices to constitute the carrier frequency filters.

The numerical values are given purely by way of indication and other values could naturally be used.

The central unit may include the transmission module and the power supply module, or it may be separate therefrom, . . . . The power supply unit may be omitted if the current coming from the power supply block possesses suitable characteristics for powering it.

The connector 8 may be omitted, with the cable 10 being connected directly to the power supply block.

The power supply block may be arranged to be connected directly to a wall outlet without passing via a cable.

What is claimed is:

1. A device, comprising:

a box containing an electronic central unit; and an external power supply block connected to the central unit by an electric cable and provided both with a connection member for connection to a power supply network delivering AC power and a data signal superposed thereon, and with a AC/DC converter for converting the AC power, wherein the box includes a carrier current data transmission module, wherein the converter is connected to the connection member and to the electric cable via a first diverter member that extracts and diverts the data signal relative to the converter, wherein the module and the central unit are connected to the electric cable by a second diverter member for separating the converted power supply current and the data signal and bringing the power supply current to the central unit and the data signal to the transmission module, and where the first diverter member has a shunt connection line connecting the connection member to the electric cable and incorporating a carrier frequency filter, the converter being connected to the shunt connection line on either side of the carrier frequency filter by an inlet line and an outlet line of the converter, the diverter member having power frequency filters connected respectively in the inlet and outlet lines.

2. The device according to claim 1, wherein at least one inductor is connected in the shunt connection line between the carrier frequency filter and the outlet line.

3. The device according to claim 1, wherein the second diverter member comprises a first line connected to the electric cable and having connected thereto a second line connected to the central unit and a third line connected to the transmission module, the second line being fitted with a power frequency filter and the third line being fitted with a carrier frequency filter.

4. The device according to claim 1, wherein at a one of the carrier frequency filters is a passive filter such as a capacitor.

5. The device according to claim 1, wherein at east one of the carrier frequency filters is an inductor.

6. The device according to claim 1, wherein each line that comprises two conductors has a filter mounted in at least one of its conductors.

* * * * *